(12) United States Patent
Konishi et al.

(10) Patent No.: US 8,152,390 B2
(45) Date of Patent: Apr. 10, 2012

(54) BARRIER UNIT

(75) Inventors: Akio Konishi, Hyogo (JP); Koichiro Hirabayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/866,048

(22) PCT Filed: Feb. 9, 2009

(86) PCT No.: PCT/JP2009/000507
§ 371 (c)(1),
(2), (4) Date: Aug. 4, 2010

(87) PCT Pub. No.: WO2009/098906
PCT Pub. Date: Aug. 13, 2009

(65) Prior Publication Data
US 2011/0002684 A1    Jan. 6, 2011

(30) Foreign Application Priority Data
Feb. 7, 2008 (JP) ................................. 2008-027449

(51) Int. Cl.
G03B 17/00 (2006.01)
G03B 11/04 (2006.01)
(52) U.S. Cl. ......................................... 396/448; 359/511
(58) Field of Classification Search .................. 396/448; 359/511
See application file for complete search history.

(56) References Cited

U.S. PATENT DOCUMENTS

| 5,754,906 A | 5/1998 | Yoshida | |
| 5,892,998 A * | 4/1999 | Kodaira et al. | 396/448 |
| 2007/0133981 A1 * | 6/2007 | Tsuji | 396/448 |

FOREIGN PATENT DOCUMENTS

| JP | 58-077971 | 5/1983 |
| JP | 09-061887 | 3/1997 |
| JP | 10-068984 | 3/1998 |
| JP | 2001-075148 | 3/2001 |
| JP | 2001-188283 | 7/2001 |
| JP | 2003-164128 | 6/2003 |

OTHER PUBLICATIONS

International Search Report for corresponding International Application No. PCT/JP2009/000507 mailed May 19, 2009.
Form PCT/ISA/237 and partial English translation for International Application No. PCT/JP2009/000507 dated May 19, 2009.

* cited by examiner

*Primary Examiner* — Rochelle-Ann J Blackman
(74) *Attorney, Agent, or Firm* — Renner, Otto, Boisselle & Sklar, LLP

(57) ABSTRACT

A barrier unit, of which the cap edge is not easily deformed even under some external force, is provided.
The barrier unit includes: a base, which defines a first window; a cap, which defines a second window and which is arranged so that the second window faces the first window; and at least one blade, which is arranged between the base and the cap so as to open or close with respect to the first and second windows. A surface of the cap that is opposed to the at least one blade has a notched portion around the second window.

2 Claims, 4 Drawing Sheets ially to the reference plane is a, and depth of the notched portion as measured parallel to the reference plane is b, then the barrier unit may satisfy $0.1<(a/b)<5$.
BARRIER UNIT

TECHNICAL FIELD

The present invention relates to a barrier unit to be opened and closed in front of the lens of a still camera or a video movie camera to protect that lens.

BACKGROUND ART

Patent Document No. 1 discloses a conventional barrier unit. FIG. 6 is a cross-sectional view illustrating a barrier unit 101 as disclosed in Patent Document No. 1.

At the center of a frontend plate portion 101A, there is a window 101a that makes an optical path with respect to a lens 109. A set of barrier blades 104, which is arranged in front of the frontend plate portion 101A, opens and closes the window 101a. When the barrier blades 104 are open, a shutter opens and closes on a shutter plate 110, thereby getting shooting done.

In this barrier unit 101, when the barrier blades 104 are fully opened or closed, a barrier blade drive ring 102 protrudes toward the direction from which light is coming, thereby pressing the barrier blades 104 against a barrier protective cap 108. As a result, sand or any other foreign matter will not easily enter the gap between the barrier blades 104 and the barrier protective cap 108.

Patent Document No. 1: Japanese Patent Application Laid-Open Publication No. 9-61887

DISCLOSURE OF INVENTION

Problems to be Solved by the Invention

In this barrier unit 101, the edge 108a of the barrier protective cap 108 forms an acute angle with respect to the barrier blades 104 in order to prevent the barrier protective cap 108 from blocking the optical path of the incoming light that is going to be incident on the lens 109. However, such an edge 108a cannot be thick enough and would be deformed easily when subjected to some external force while the camera is used.

Also, such a barrier unit 101 is usually designed so as to leave as narrow a gap as possible between the barrier blades 104 and the barrier protective cap 108 to prevent sand or any other foreign matter from entering that gap while the barrier blades 104 are opening or closing. That is why if the edge 108a of the barrier protective cap were deformed, then there would be no clearance between the barrier blades 104 and the barrier protective cap 108 anymore, thus interfering with opening or closing of the barrier blades 104.

On top of that, a portion of the cap surrounding the window is also designed so as to be sloped steeply in order to prevent reflected light from reaching the lens. That is why when subjected to some external force, that portion would also be easily deformed and would interfere with opening or closing of the barrier blades, which is a problem.

It is therefore an object of the present invention to provide a barrier unit, of which the cap edge is not easily deformed even under some external force.

Means for Solving the Problems

A barrier unit according to the present invention includes: a base, which defines a first window; a cap, which defines a second window and which is arranged so that the second window faces the first window; and at least one blade, which is arranged between the base and the cap so as to open or close with respect to the first and second windows. A surface of the cap that is opposed to the at least one blade has a notched portion around the second window.

If the surface of the cap that is opposed to the at least one blade is a reference plane, the height of the notched portion as measured perpendicularly to the reference plane is a, and depth of the notched portion as measured parallel to the reference plane is b, then the barrier unit may satisfy $0.1<(a/b)<5$.

A design clearance may be provided between the reference plane and the at least one blade. Around the second window, the upper end of the notched portion may be spaced apart from the at least one blade by the sum of the clearance and the height a of the notched portion.

If the surface of the cap that is opposed to the at least one blade is a reference plane, the cap may have, around the second window, a first sloped portion, which defines a first angle of less than 90 degrees with respect to the reference plane, and a second sloped portion, which is arranged so as to run from the first sloped portion toward the second window and to define, with respect to the reference plane, a second angle that is greater than the first angle and that is also less than 90 degrees.

Another barrier unit according to the present invention includes: a base, which defines a first window; a cap, which defines a second window and which is arranged so that the second window faces the first window; and at least one blade, which is arranged between the base and the cap so as to open or close with respect to the first and second windows. If the surface of the cap that is opposed to the at least one blade is a reference plane, the cap has, around the second window, a first sloped portion, which defines a first angle of less than 90 degrees with respect to the reference plane, and a second sloped portion, which is arranged so as to run from the first sloped portion toward the second window and to define, with respect to the reference plane, a second angle that is greater than the first angle and that is also less than 90 degrees.

EFFECTS OF THE INVENTION

In the barrier unit of the present invention, the cap has a predetermined notched portion at its edge that surrounds its window. That is why even if the cap edge of the barrier unit is deformed under some external force, a clearance is still provided by the notched portion at that edge between the blade and the cap. As a result, neither opening nor closing of the blade is interfered with.

Also, in another barrier unit according to the present invention, the cap has, around its window, a first sloped portion, which defines a first angle of less than 90 degrees, and a second sloped portion, which runs continuously from the end of the first sloped portion to define a second angle that is greater than the first angle and that is also less than 90 degrees. By providing such a sloped portion that defines a greater angle around the edge of the window, the cap edge of the barrier unit is not deformed easily even under some external force.

Figure 1:
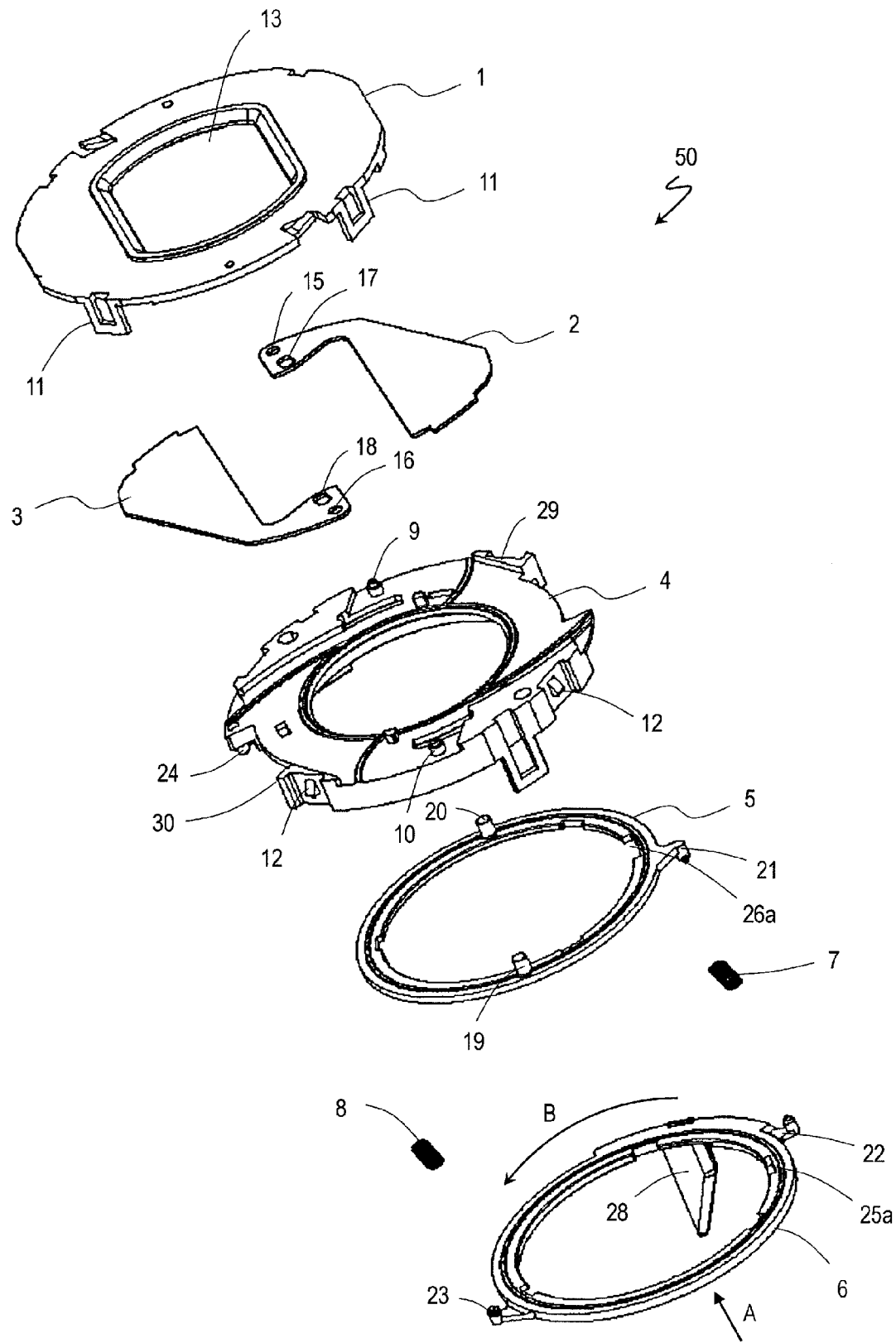
FIG. 1 is an exploded perspective view illustrating the upside of respective members of a barrier unit 50.

DESCRIPTION OF REFERENCE NUMERALS 1 cap
1a notched portion
1b first sloped portion
1c second sloped portion
2 first blade
3 second blade
4 base

BEST MODE FOR CARRYING OUT THE INVENTION

Hereinafter, a preferred embodiment of a barrier unit according to the present invention will be described with reference to the accompanying drawings.

Figure 2:
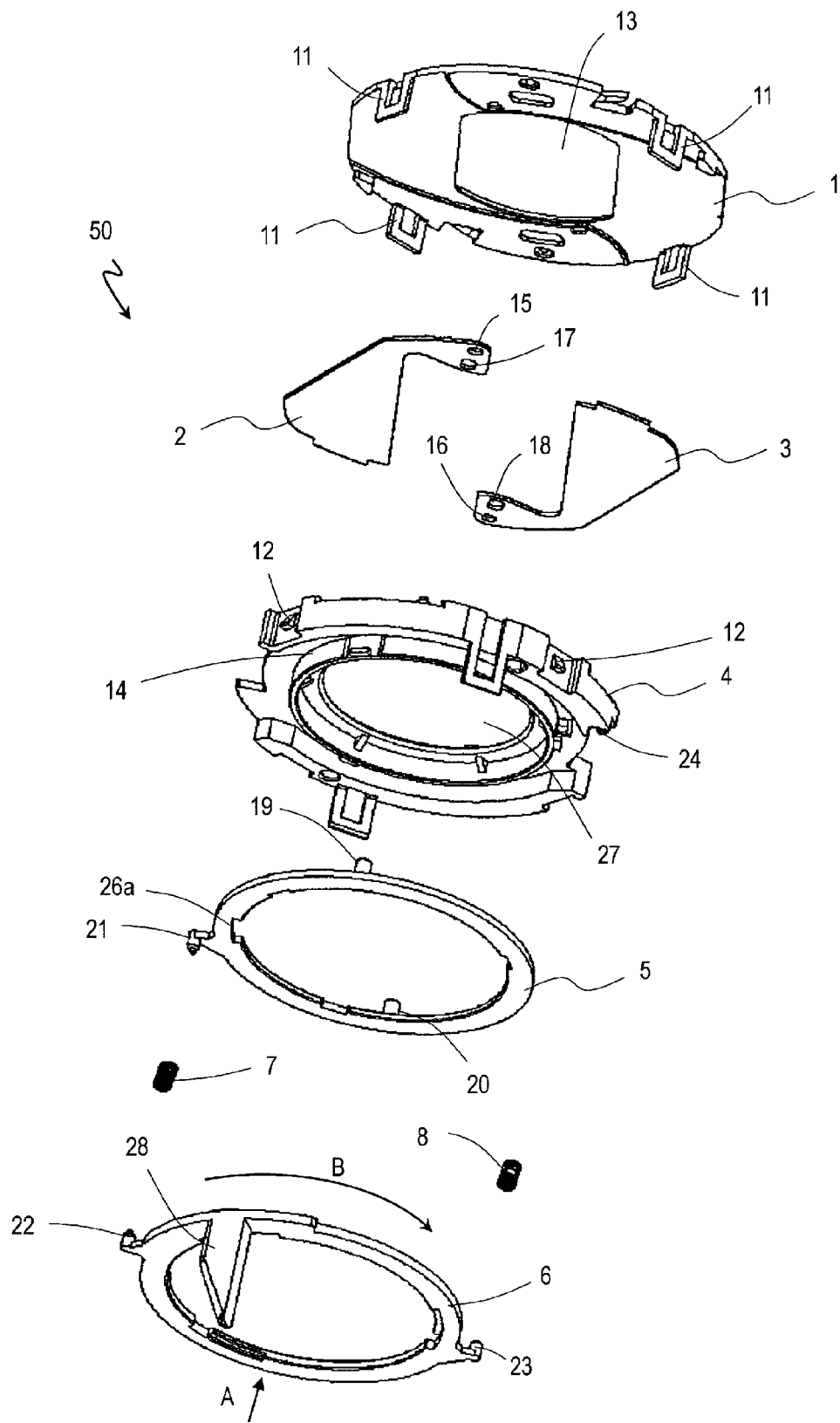
FIG. 2 is an exploded perspective view illustrating the downside of respective members of the barrier unit 50.

FIGS. 1 and 2 are exploded perspective views respectively illustrating the upside and downside of respective members of a barrier unit 50 according to the present invention.

As shown in FIGS. 1 and 2, the barrier unit 50 includes a cap 1, first and second blades 2 and 3, a base 4, first and second rings 5 and 6, and first and second springs 7 and 8.

The first and second blades 2 and 3 are pivoted to the base 4 by fitting pivots 9 and 10 on the base 4 into pivot holes 15 and 16, respectively. By getting hooks 11, which are elastic members that form integral parts of the cap 1, engaged with hook stoppers 12 of the base 4, the cap 1 is fitted to the base 4 so as to sandwich the first and second blades 2 and 3 between them and to leave a predetermined clearance that is wide enough to let those blades 2 and 3 turn freely there.

The cap 1 is provided to protect the first and second blades 2 and 3 in opened position.

The cap 1 has a window 13. The first and second rings 5 and 6 are fitted rotatably to the cylindrical portion 14 of the base 4. The cam pins 19 and 20 of the first ring 5 are engaged into elongate holes 17 and 18 of the first and second blades to turn the blades.

The first spring 7 is hooked between respective spring hooks 21 and 22 of the first and second rings 5 and 6. Likewise, the second spring 8 is hooked between respective spring hooks 23 and 24 of the second ring 6 and the base 4.

The second ring 6 has a ring projection 25a, which is fitted into a notched portion 26a of the first ring 5, thereby assembling the first and second rings 5 and 6 together.

The base 4 also has a window 27 (see FIG. 2) and is arranged so as to face the cap 1. In this case, these two windows 27 and 13 are also arranged to face each other so that a subject image passes through the windows 27 and 13 of the base 4 and the cap 1. As a result, an optical path that guides the subject image to a lens is formed.

The second ring 6 has a cam portion 28, which is biased by driving means (not shown) to the direction in which the first and second blades 2 and 3 close, as indicated by the arrow B. In this way, the second ring 6 is driven.

The first and second rings 5 and 6 are combined together with the first spring 7. As the second ring 6 is driven in the closing direction (as indicated by the arrow B) by the cam portion 28, the first and second blades 2 and 3 are closed. And even if the second ring 6 can afford to further turn in the same closing direction after that, the first spring 7 expands to prevent the second ring 6 from going too far with respect to the first ring 5.

On the other hand, the second spring 8 biases the second ring 6 to the opening direction, thereby driving the first ring 5 as the ring projection 25a and the notched portion 26a are engaged with each other. The cam pin 19 is fitted into the elongate hole 17 to bias the first blade 2 to the opening direction. And the first blade 2 eventually contacts with a stopper 29 and stops turning there.

Figure 3:
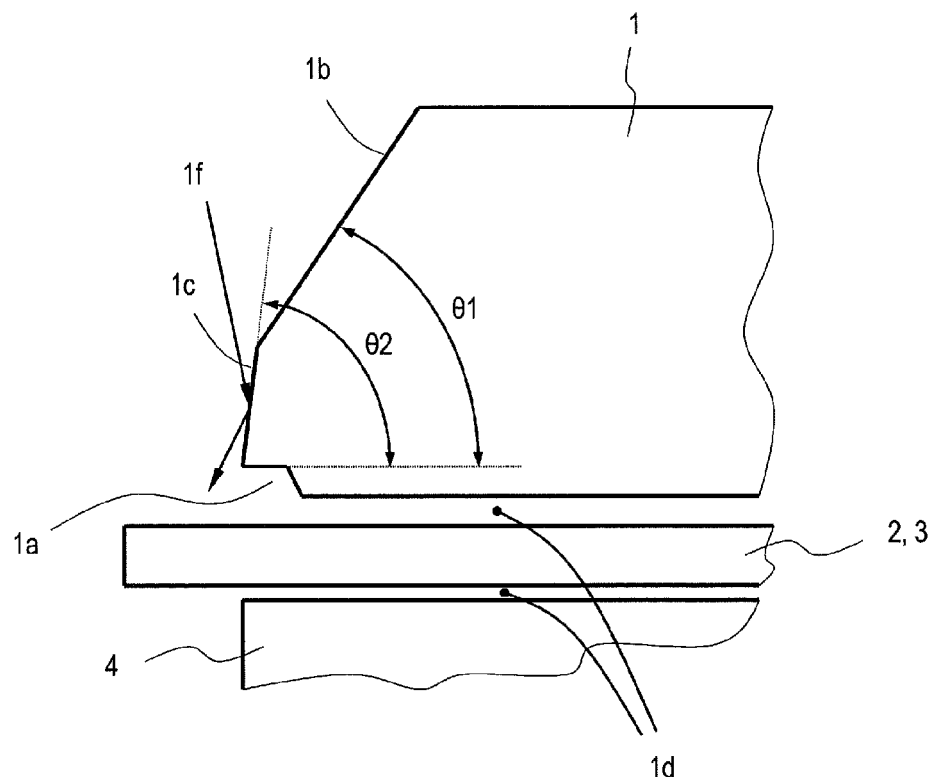
FIG. 3 is an enlarged view illustrating the cap edge of the barrier unit 50 in detail.

FIG. 3 is an enlarged view illustrating the cap edge of the barrier unit 50 in detail.

In FIG. 3, illustrated are the cap 1, the first and second blades 2 and 3, and the base 4. The first and second blades 2 and 3 are sandwiched between the cap 1 and the base 4 to open and close along with the cap 1 and the base 4. Gaps 1d are left between the cap 1 and the first and second blades 2 and 3 and between the first and second blades 2 and 3 and the base 4 to let the blades open and close smoothly.

The barrier unit 50 of this preferred embodiment is partly characterized in that the cap 1 has a notched portion 1a at its edge. The notched portion 1a may form a ring around the entire periphery of the cap's window 13. As a result, around the window 13 of the cap 1, the upper end of the notched portion 1a is spaced apart from the first and second blades 2 and 3 by the sum of the clearance 1d and height of the notched portion 1a (i.e., the distance "a" to be described later with reference to FIG. 5).

Optionally, the notched portion 1a may also be arranged in only a part of the periphery of the cap's window 13. More particularly, the notched portion 1a just needs to be arranged only where the first and second blades 2 and 3 pass while opening or closing.

The window 13 of the cap 1 has two sloped portions, which form mutually different tilt angles and which will be referred to herein as "first sloped portion 1b" and "second sloped portion 1c", respectively. If the bottom of the cap 1 (i.e., the surface of the cap 1 that is opposed to the first and second blades 2 and 3) is supposed to be a reference plane, the first sloped portion 1b defines a tilt angle $\theta 1$ with respect to the reference plane and the second sloped portion 1c defines a tilt angle $\theta 2$ with respect to the reference plane. These angles $\theta 1$ and $\theta 2$ meet the following relations:

$\theta 1 < 90$ degrees, $\theta 2 < 90$ degrees, and $\theta 1 < \theta 2$

Next, it will be described with reference to FIG. 4 what effects will be achieved by providing such a notched portion 1a and the sloped portions 1b and 1c that satisfy these relations.

Figure 4:
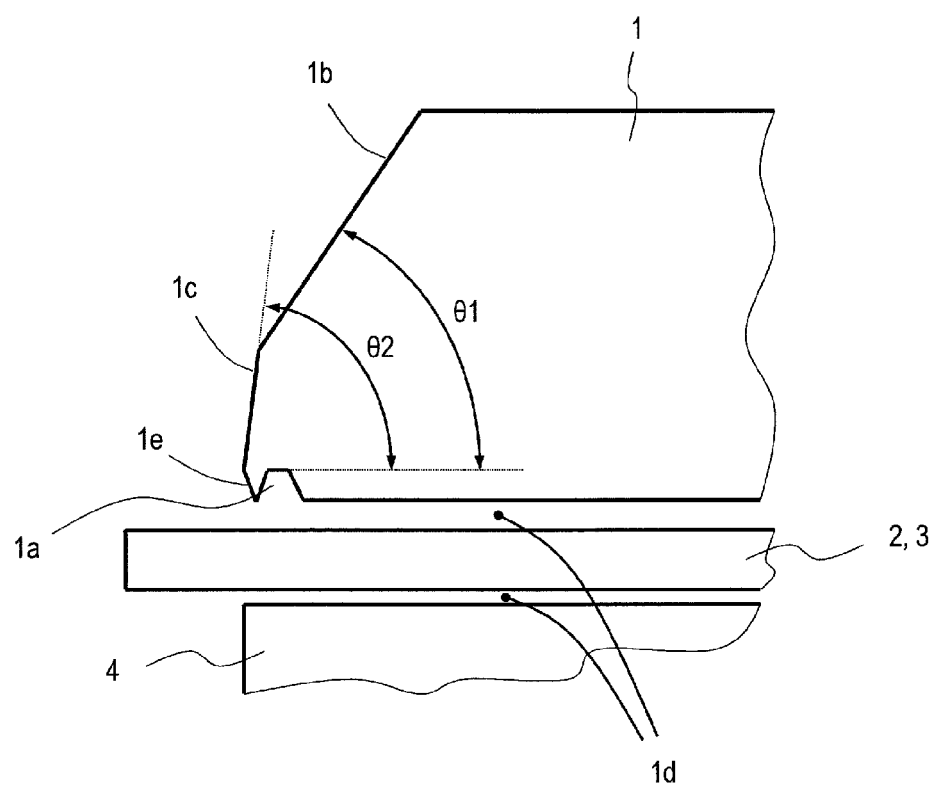
FIG. 4 is an enlarged view illustrating in detail what the cap edge will do when the cap 1 of this barrier unit 50 is deformed.

FIG. 4 is an enlarged view illustrating in detail what the cap edge will do when the cap 1 of this barrier unit 50 is deformed. Specifically, in FIG. 4, illustrated is the cap edge 1e that has been deformed under some external force. Since the notched portion 1a is provided according to this preferred embodiment, the deformed cap edge 1e never contacts with the first and second blades 2 and 3. As a result, a clearance 1d that is wide enough to turn the blades 2 and 3 smoothly is still left and opening or closing of the first and second blades 2 and 3 is never interfered with.

On top of that, as the second sloped portion 1c with the tilt angle $\theta 2$ is provided for the cap edge, the edge is not easily deformed under external force to begin with. What is more, as $\theta 2$ is not equal to 90 degrees, no flare phenomenon will be produced by the reflected light 1f shown in FIG. 3. Consequently, the optical performance of the lens is not affected.

It should be noted that it is not always necessary to provide BOTH of the notched portion 1a and the sloped portions 1b and 1c. That is to say, only the notched portion 1a or the sloped portions 1b and 1c may be provided. This is because even if no notched portion 1a is provided, the cap's window 13 and its surrounding portion will not be deformed easily under external force as long as the sloped portions 1b and is are provided.

Figure 5:
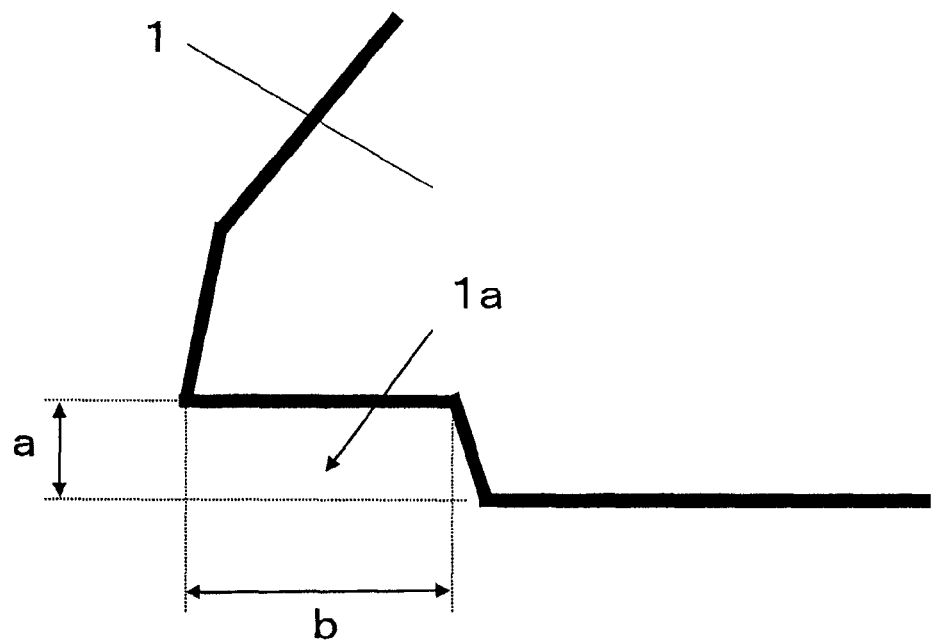
FIG. 5 is an enlarged view illustrating the notched portion 1a on a larger scale.
Figure 6:
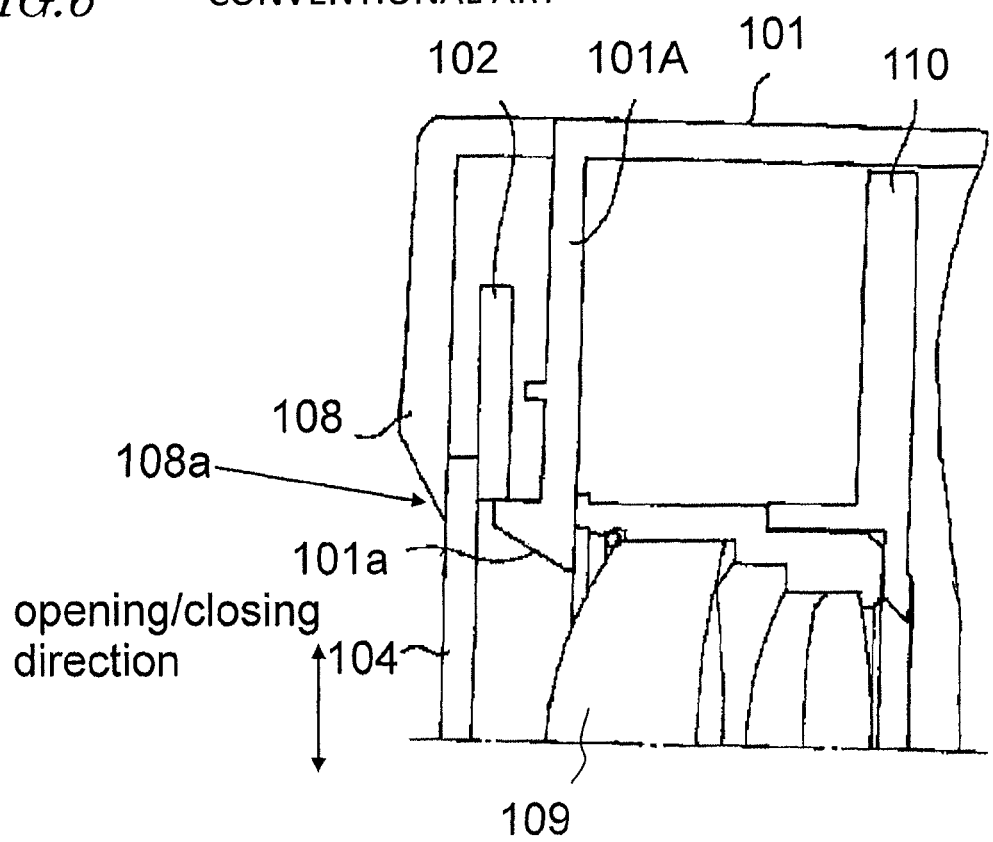
FIG. 6 is a cross-sectional view illustrating a barrier unit 101 as disclosed in Patent Document No. 1.

FIG. 5 is an enlarged view illustrating the notched portion 1a on a larger scale.

Suppose the height a and the depth b of the notched portion 1a are defined as shown in FIG. 5. Specifically, the height a is the distance from the reference plane to the upper end of the notched portion 1a as measured perpendicularly to the reference plane (i.e., along the optical path). On the other hand, the depth b is the distance from the edge of the cap's window 13 to the deepest point of the notched portion 1a as measured parallel to the reference plane.

In that case, the height a and the depth b preferably satisfy the following inequality:

$$0.1<(a/b)<5$$

The following is the reason.

As described above, with the notched portion 1a provided, the deformed cap edge 1e will not contact with the first and second blades 2 and 3 anymore. However, if the height a were unnecessarily great for the depth b, the incoming light would reach the depth of the notched portion 1a. In that case, the optical conditions of the light entering the lens would vary so much as to produce a flare phenomenon. On top of that, as the clearance between the cap 1 and the first and second blades 2 and 3 would look very wide in that case, the appearance of the barrier unit would be ruined. For that reason, considering the relation between the height a and the depth b of the notched portion 1a, it is not preferred that the height a of the notched portion 1a be excessive.

On the other hand, if the depth b were unnecessarily great for the height a, then the deformed cap edge 1e would contact with the first and second blades 2 and 3 more easily. For the first and second blades 2 and 3 shown in FIG. 3, provided is a rail (not shown) that regulates their movement on the right-hand side of the paper (i.e., in the direction in which the first and second blades 2 and 3 are housed). That is to say, the first and second blades 2 and 3 open and close using that rail as a fulcrum. In such a situation, if the depth b of the notched portion 1a were excessive, the fulcrum would be located at a deeper point. In that case, even if the first and second blades 2 and 3 were slightly tilted for some reason, the blades 2 and 3 could contact with the deformed cap edge 1e. For that reason, considering the relation between the height a and the depth b of the notched portion 1a, it is not preferred that the depth b of the notched portion 1a be excessive.

In view of these considerations, the height a and the depth b of the notched portion 1a preferably fall within the range defined above.

In the foregoing description of preferred embodiments, two blades (which are referred to herein as first and second blades 2 and 3) are supposed to be used. However, this is just an example. Alternatively, only one blade or even three or more blades may also be used. That is to say, at least one blade has only to be provided. In any case, as long as there is a blade that can open or close the window, the notched portion 1a works fine when the cap's edge is deformed.

Industrial Applicability

The present invention provides a barrier unit to be opened or closed in front of the lens of a still camera or a video movie camera to protect that lens. Even if the cap edge of the barrier unit is deformed under some external force, a wide enough clearance can still be left between the blades and the cap by the notched portion at that edge. As a result, neither opening nor closing of the blades is interfered with. On top of that, by providing a sloped portion with a greater tilt angle at that edge, a robust and reliable barrier unit, of which the cap edge is not deformed easily even under some external force, is provided.

The invention claimed is:

1. A barrier unit comprising:
   a base, which defines a first window;
   a cap, which defines a second window and which is arranged so that the second window faces the first window; and
   at least one blade, which is arranged between the base and the cap so as to open or close with respect to the first and second windows,
   wherein a surface of the cap that is opposed to the at least one blade has a notched portion around the second window,
   wherein the surface of the cap that is opposed to the at least one blade is a reference plane, and the cap has, around the second window, a first sloped portion, which defines a first angle of less than 90 degrees with respect to the reference plane, and a second sloped portion, which is arranged so as to run from the first sloped portion toward the second window and to define, with respect to the reference plane, a second angle that is greater than the first angle and that is also less than 90 degrees, and
   wherein the height of the notched portion as measured perpendicularly to the reference plane is (a), the depth of the notched portion as measured parallel to the reference plane is (b), and the barrier unit satisfies $0.1<(a/b)<5$.

2. The barrier unit of claim 1, wherein a design clearance is provided between the reference plane and the at least one blade, and
   wherein around the second window, the upper end of the notched portion is spaced apart from the at least one blade by the sum of the clearance and the height (a) of the notched portion.

* * * * *